(12) United States Patent
Chu et al.

(10) Patent No.: US 6,325,283 B1
(45) Date of Patent: Dec. 4, 2001

(54) COMPUTER IMPLEMENTED PROGRAM FOR INVENTORY MANAGEMENT

(76) Inventors: Soy Chu, 2211 Wakerobin La., Reston, VA (US) 20191; Edward Chu, 43525 Clivedon Ct., Ashburn, VA (US) 20147; Steven Lin, 10383 Aragon Ct., Manassas, VA (US) 20112

( * ) Notice: Subject to any disclaimer, the term of this patent is extended or adjusted under 35 U.S.C. 154(b) by 0 days.

(21) Appl. No.: 09/695,230

(22) Filed: Oct. 25, 2000

(51) Int. Cl.[7] .................... G06F 17/00; G06K 15/00
(52) U.S. Cl. ........................... 235/375; 235/383
(58) Field of Search ....................... 235/375, 462.15, 235/383, 385; 902/25, 26, 27

(56) References Cited

U.S. PATENT DOCUMENTS

| | | | |
|---|---|---|---|
| 4,481,412 | * 11/1984 | Fields | 235/472 |
| 4,922,111 | 5/1990 | Kuwano et al. | 250/566 |
| 5,047,614 | 9/1991 | Bianco | 235/385 |
| 5,189,291 | 2/1993 | Siemiatkowski | 235/472 |
| 5,227,614 | 7/1993 | Danielson et al. | 235/380 |
| 5,324,925 | 6/1994 | Koenck et al. | 235/472 |
| 5,334,822 | * 8/1994 | Sanford | 235/385 |
| 5,478,989 | * 12/1995 | Shepley | 235/375 |
| 5,521,369 | 5/1996 | Kumar | 235/472 |
| 5,532,466 | 7/1996 | Konno et al. | 235/441 |
| 5,671,374 | 9/1997 | Postman et al. | 395/309 |
| 5,708,262 | 1/1998 | Goldman et al. | 235/492 |
| 5,712,989 | * 1/1998 | Johnson et al. | 395/228 |
| 5,744,789 | 4/1998 | Kashi | 235/472 |
| 5,767,494 | 6/1998 | Matsueda et al. | 235/454 |
| 5,777,315 | * 7/1998 | Wilz et al. | 235/472 |
| 5,873,070 | 2/1999 | Bunte et al. | 705/28 |
| 5,884,102 | 3/1999 | England et al. | 395/882 |
| 5,902,991 | 5/1999 | Kumar | 235/492 |
| 5,928,336 | 7/1999 | Takeuchi | 710/1 |
| 5,937,423 | 8/1999 | Robinson | 711/103 |
| 6,179,206 | * 1/2001 | Matsumori | 235/383 |
| 6,182,053 | * 1/2001 | Rauber et al. | 705/28 |

* cited by examiner

Primary Examiner—Karl D. Frech
Assistant Examiner—April A. Nowlin
(74) Attorney, Agent, or Firm—Wenderoth, Lind & Ponack, L.L.P.

(57) ABSTRACT

The NYTBridge allows a user to bridge the gap between data collected by hand-held scanning devices and conventional databases used in the field of inventory management without database or procedural programming knowledge on the part of the user. The NYTBridge does this by first allowing the user to access an existing database. The user may then select data fields, such as the location of an item in inventory, from the database without writing coded database queries. The NYTBridge then allows the user to download the selected data fields as a data set along with a scanner program that will read the created data set. Both the data set and the scanner program are either saved on a PCMCIA card to be used in a scanner, or downloaded directly into the hand held scanner via either serial port communication or communication dock tethering. When the scanner program is run on the scanner, the scanner program creates a scanner file for the collected, verified and/or corrected data. After the data is collected, verified and/or corrected, NYTBridge reads the scanner file from the hand held scanner and allows the user to update the relational database. The NYTBridge utilizes a graphical user interface and does not require low level programming by the user at any stage of the inventory management process.

24 Claims, 5 Drawing Sheets

COMPUTER IMPLEMENTED PROGRAM FOR INVENTORY MANAGEMENT

BACKGROUND OF THE INVENTION

1. Field of the Invention

The source code for the NYTBridge (the scanner program and the graphical user interface) as a computer program listing appendix has been submitted on compact disk. The material on the compact disk is hereby incorporated by reference. Two identical compact disks have been submitted. Each compact disk contains two files: 91) bridge.ccp (28,292 bytes); and (2) GUI Source Code.txt (132,648 bytes). The disks were created on Jun. 12 and 14, 2001, respectively.

2. Description of the Related Art

Most companies in the inventory management field require the services of computer programmers familiar with both database and procedural programming languages. The programmers are required to complete a series of complicated steps in order to enable a client company to collect data and update an existing database with the collected data. The programmers must be familiar with the language of the specified database and run queries to access pertinent information in the database. The programmers then have to convert the pertinent information from the database into an ASCII text file or other readable file. The programmers then write a low-level program for a scanning device that incorporates the converted database information. The program must also be capable of creating an output file for collected data. Finally, the programmer must process and transfer the collected data from the scanner into the database. Performing these complex steps is very time intensive, since the programmers are required to essentially develop a custom program for each client company. This customization is required due to the many different database programs, the large number of ways inventory systems can be set up, and the different types of information that can be stored in databases. As a result, inventory management is very expensive due to the costs associated with hiring highly skilled programmers for long periods of time to preform these steps.

SUMMARY OF THE INVENTION

The present invention, called the "NYTBridge", allows a user who is unskilled in database or procedural programming to access an existing database, create a format file that will customize a unique data collection/verification program (scanner program) for use with a scanning device, and update the existing database with data collected by the scanning device running the data collection program. The NYTBridge comprises two main software components to bridge the gap between data stored in a relational database and data collected by a hand held scanning device.

The two main software components are a graphical user interface, which will have access to the relational database, and a scanner program, which will operate on the hand held scanner device. The graphical user interface will allow the user to view and analyze a specified database. The user may then select data fields, such as columns or tables, from the database to be used by the scanning program for data collection/verification. The graphical user interface will also allow the user to update the relational database with the information collected using the scanner program. The user will select a specific data file (scanner file) created by the scanner program and the graphical user interface will read the information from the scanner file and update the relational database. The information may be transferred between the relational database and the scanner based hand held device via PCMCIA cards, serial port communication, communication dock tethering, etc.

The scanner program will be able to take the data set created by the user with the graphical user interface and allow them to collect/verify the information specified in the data set with the hand held scanning device. The scanner program can be transferred to the hand held scanner along with the data set created by the graphical user interface. When the scanner program runs on the scanning device, it will accept the parameters specified in the format file and create a scanner file for the collected data. This scanner file will then be used by the graphical user interface to update the relational database.

BRIEF DESCRIPTION OF THE DRAWINGS

These and other objects of the present invention will be realized by reference to the following detailed description, taken in accordance with the accompanying drawings, in which.

DETAILED DESCRIPTION OF THE INVENTION

The present invention relates to a computer implemented method for inventory management. The NYTBridge utilizes two main software components, a graphical user interface (GUI) and a scanner program (SP), to bridge the gap between data stored in a relational database and data collected by a hand held scanning device.

Figure 1:
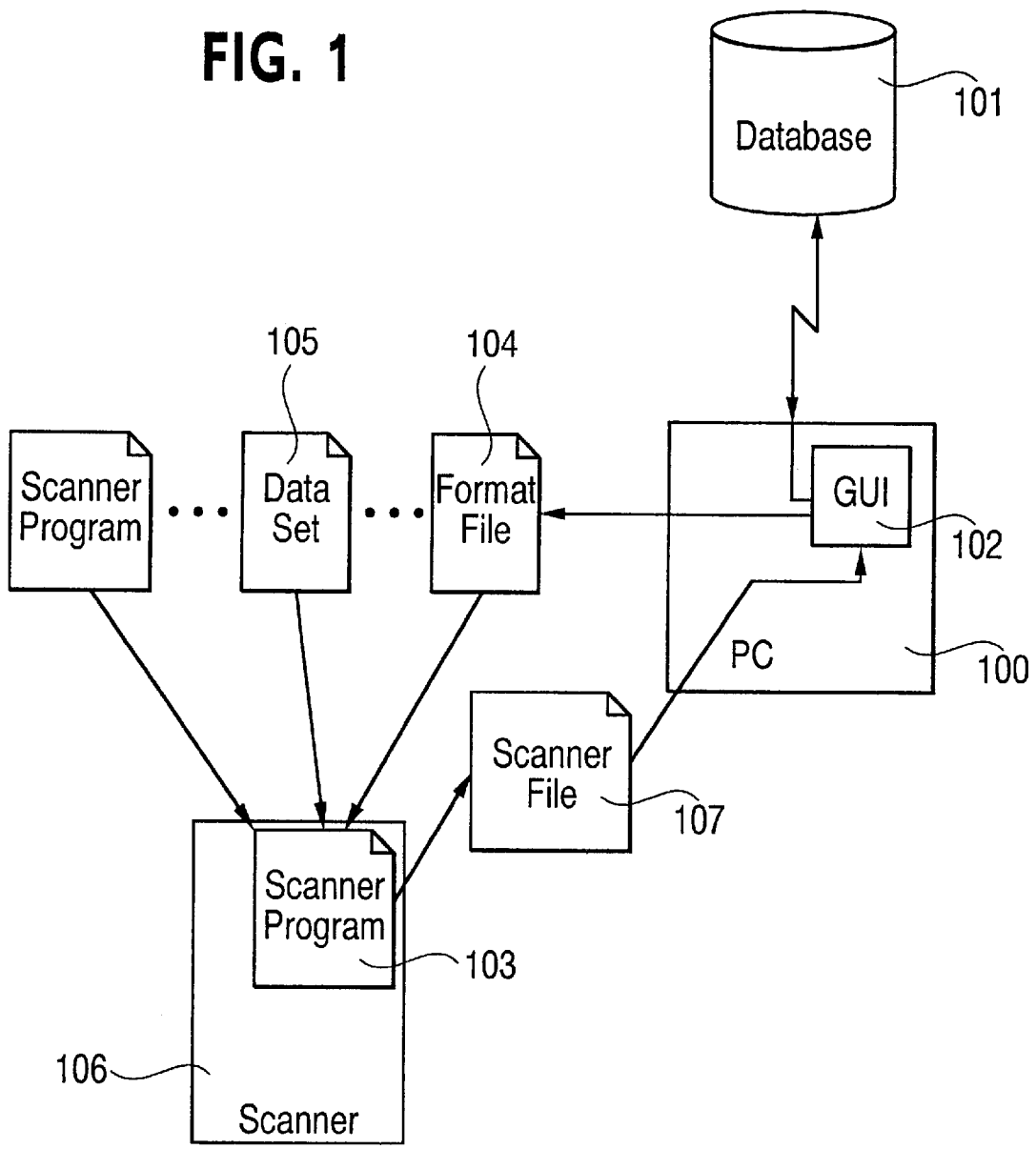
FIG. 1 is a system overview of the invention's primary connections to the programming and physical resources on which it executes.

FIG. 1 shows the GUI 102 and SP 103 and their primary connections to the physical resources on which they execute, as well as peripheral devices for operation of the invention. The GUI 102 of the present invention has been developed to preferably run on a personal computer system (PC) 100 with a minimum of a Pentium class processor. The PC 100 should preferably have 32 Megabytes of RAM, 15 Megabytes of free hard drive space and be running either Windows 95, 98, or NT. In the preferred embodiment of the invention, the PC 100 has 64 Megabytes of RAM, 25 Megabytes of free hard drive space and will be running either Windows 95, 98, or NT. It is important to note that even though the GUI 102 of the present invention has been designed to run on a computer system running either Windows 95, 98, or NT operating systems, the GUI could be adapted to run on a computer system using other operating systems, such as Linux or DOS for example.

The PC 100 is operable to communicate with a database 101. The database 101 may be contained in the PC 100 or located in another computer that is connected to the PC 100 via a LAN, the Internet, or other type of connection. The database 101 can be any one of numerous types of databases, including Microsoft Access or Oracle.

The GUI 102 handles all communication with the database 101. It can "seamlessly" generate a data set 105 and a format file 104 based on specifications provided by the user. The data set 105 and format file 104 are downloaded to a scanning device 106 running the SP 103. Once the scanning device (hand held scanning device) 106 is used by the user to collect/verify data, a scanner file 107 is then uploaded to the GUI 102. The GUI 102 then "seamlessly" updates the database 101 with the newly collected information in the scanner file 107.

The SP 103 is generated by the GUI 102 and can by downloaded to the scanning device 106 at the same time as the data set 105 and the format file 104. In addition, the SP 103 may have previously been downloaded to the scanning device 106. The SP 103 uses the format file 104 to set up an initial program configuration. This configuration tells the program what information is to be collected and how it should be verified. The data set 105 is used to indicate to the user what data fields are the subject of the correction and/or verification. When run on the scanning device 106, the SP 103 will interact with the user to collect/verify data. For example, the data set will indicate that items in location "Room A" should be scanned, while allowing the user to collect and/or verify that information.

The SP 103 has been designed to run on a scanning device having a medium for data storage. The greater the amount of storage available on the scanning device, the greater amount of data that can be carried. In the preferred embodiment of the present invention, a scanning device utilizing PCMCIA cards is used. Using a scanning device that relies on PCMCIA cards for storage provides two benefits. First, no tethering is needed between the scanning device and the computer system, and data transfer is as simple as copying files to a floppy disk. Second, the PCMCIA card can drastically increase the storage capacity of the hand held scanner device. The typical hand held scanner device has very limited storage capacity without the use of a PCMCIA card.

Figure 2:
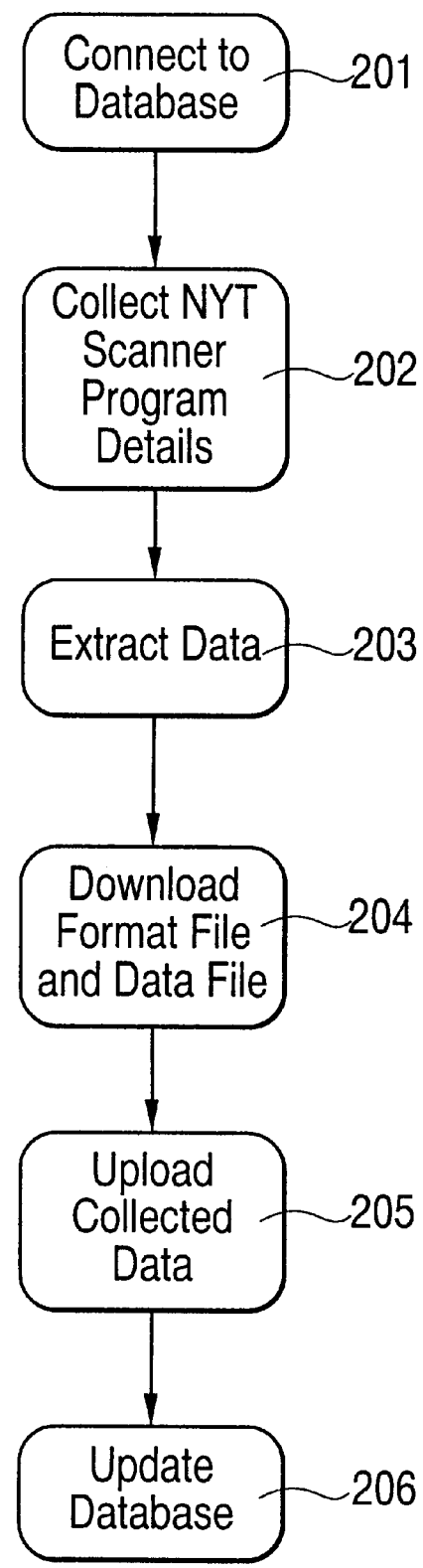
FIG. 2 is a flow diagram of the basic tasks of the graphical user interface.

FIG. 2 is a flow diagram of the general tasks of the GUI 102. After receiving instructions from a user, at 201, the GUI 102 creates a connection to the database 101 using a proper driver. The GUI 102 then collects program specifications for the SP 103 and generates the format file 104 at 202 At 203, the GUI 102 then extracts data from the database 101 and generates the data set 105. At 204, the GUI downloads the data set 105, the format file 104 and if not already on the scanning device 106, the SP 103 to the scanning device 106. The user then uses the scanning device 106 to scan inventory for the collection/verification of data. The SP 103 then creates a scanner file 107 with the data that is collected/verified. At 205, the scanner file 107 is then uploaded to the GUI 102. The GUI 102 then uses the scanner file 107 to update the database 101 at 206.

In order to let users take advantage of NYTBridge's data features, the GUI 102 uses user-friendly interfaces. The GUI 102 has easy to understand popup screens with full text and detailed online help information. The online working structures can guide the user through the entire data process and are intended to aid users inexperienced in inventory data management.

The SP 103 of the NYTBridge runs on the scanner device 106 which can communicate with the PC 100 and has sufficient storage capacity for the users requirements. The user will be able to download information from the GUI 102 to the scanning device 106. By running the SP 103, the user can perform data collection/verification which have various uses, depending on the task at hand.

Some sample screens for the NYTBridge can be found n an appendix at the end of this application.

In order to perform the tasks illustrated in FIG. 2 and described above, the NYTBridge utilizes specific information inputted by the user into the GUI 102. The preferred information is listed and described as follows:

1. Database—the name of the current database.
2. Database Type—the type of the current database, such as a Microsoft Access database, SQL database, or Excel file.
3. Database Location—the working directory of the current database.
4. Password and ID—required if the database has security protection.
5. Title—the description of the format file for the SP 103.
6. Comments—any additional information pertaining to the format file 104 for the SP 103.
7. Selected Data Fields—when the connection to the database 101 is successful, the GUI 102 will list all available data fields contained in the current database. The user will select data fields for data collection/verification and those fields will appear on a selected data fields list box with all of their properties.
8. Data Field Information—each data field has specific information associated with it. Some of the information can be modified by the user and some of it cannot.
   a. Data Type (user cannot modify).
   b. Data Size (user cannot modify).
   c. Prompt—text displayed to the user when collecting information for this data field.
   d. Display Collected Data—whether or not the collected data should be displayed to the user when additional data is collected.
   e. Collection Type/Validation Type—indicates whether the collected data has to have an exact length, whether the collected data can be blank (i.e. indicates whether the collection of the data is optional), whether the collected data has to be a numbers, whether the collected data can have special characters, whether the collected data has to be scanned.
   f. Which data field is the "Key Field"—The Key Field is a data item that will be used to search within the data set 105, which was downloaded to the scanner device 106.

As mentioned above, the GUI 102 consists of a user friendly interface. The GUI 102 logically divides tasks and displays them in clearly visible popup screens as it walks the user through the entering of information. If the user requires additional guidance, they can get help, including detailed explanations of each task. Each task will guide the user through one or more screens to collect the information and prompt the user to provide the information necessary to perform each task. The following will give a basic overview of the general screen flow of the GUI 102.

Screen One: Intro Screen—a welcome screen that gives an overview of the purpose of NYTBridge. Users can perform actions by selecting menu items. For the remainder of this section it is assumed a user has requested to "Create a New Job for Database Interaction" from the menu. Other things the user can select from the menu include: Create a New Job without Database Interaction; Edit a Job; Build SP Specs (Format File); Specify Data Set Filters; Build Data Set; Upload Scanner File; and Rollback an Uploaded Database—all changes to the database will be archived, providing the user with an audit trail of changes. This audit trail can be used to "rollback" modifications that may have been deemed bad.

Screen Set Two: Database Selection—these screens will enable the user to provide information about the current database, including database type, name, location, and login information. These screens guide the user to specify all the information needed by the GUI 102 to open a connection to the selected database.

Screen Set Three: Select the Working Data Fields—once the GUI 102 has opened the connection to the database, it will gather the table/column information. Once that information has been retrieved, the user will be able to select data fields of the database using a keyboard or mouse. These selected data fields will be stored internally until the user has finished this phase.

Screen Set Four: NYTBSP Program Specifications—this screen will prompt the user to answer questions about the SP 103. Once the user has answered all the questions, the GUI 103 will take the information and display it to the user. The user will have the ability to change any specifications at this point in time.

Screen Five: Extracting Data from Database—this screen guides the user through the extracting data from a database task illustrated in FIG. 2 and discussed above. The screen allows the user to filter the selected data fields before they are stored in the data set 105. This feature allows the user to select a subset of the selected data fields for download to the scanning device 106. Once this information is gathered and approved by the user, the data set 105 is saved and ready to be transferred to the hand held scanner 106.

Screen Set Six: Verification—these screens go through all of the data collected and ensure the information that the user has entered will work correctly with the SP 103. If there are problems, the GUI 102 will inform the user of these problems so the user can fix them. Once the GUI 102 determines there are no problems, it will build the format file 104 to be transferred to the hand held scanner 106. Once the user has entered all of the information and the GUI has ensured that no problems exist with regard to the information, the information is saved as a job file so that it can be retrieved at a later time. The preferred job file will contain the format file, database connection information, the scanner file name, data set information, if used, including the data set name and information on how the data set is generated.

Once the SP 103, if necessary, the format file 104 and the data set 105 have been transferred to the scanning device 106, the user is now ready to use the SP 103 running on the scanning device 106 to collect/verify whatever information they wish.

Screen Seven: Uploading Data from a Scanner—this allows the user to specify for which job they are uploading data. Once the user has specified a job, the GUI 102 ensures that the proper database is there and then uploads the data in the scanner file 107 into the database. At the same time as or prior to the GUI 102 uploading the data from the scanner file 107, it archives the data to be modified to ensure the user has an audit trail. This audit trail can be used to "rollback" any improper changes that may have occurred due to user error.

Screen Eight: View Transaction Log—these screens allow the user to view the changes made to the existing database. These screens allow the user to view the audit trail that is built when the GUI 102 updates the database with the scanner file 107 from the scanning device 106.

Figure 3:
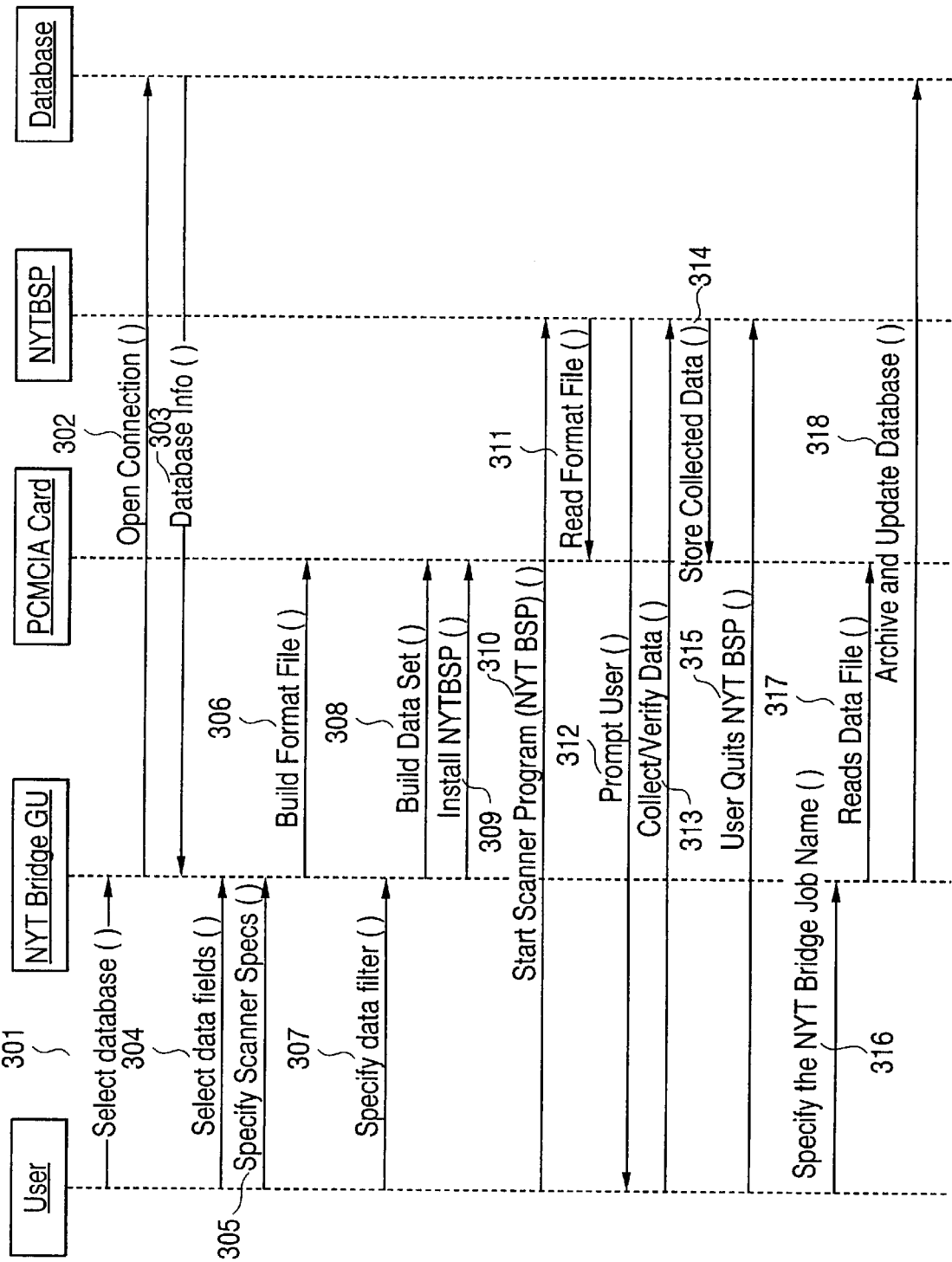
FIG. 3 is a comprehensive task sequencing diagram of a first embodiment of the present invention.

FIG. 3 is a sequence diagram of the preferred embodiment of the NYTBridge using a PCMCIA card to transfer the data set 105, format file 104, SP 103, and scanner file 107 between the PC 100 and the scanner device 106. At 301, the user selects a database. This process collects information needed to open a connection to the database, including the database type (i.e. Oracle, SQL, Server, Access), database name, and username/password, if verification is necessary.

At 302, the GUI 102 uses the information retrieved at 301 to open a connection to the database. The connection to the database can be achieved by using active data objects, as well as with other methods. If the connection is successfully opened, the database information is returned to the GUI 102 at 303. If the connection is not successful, the user must go back to 301 and correct the problem. Once the GUI 102 has all the database information, it presents the database information to the user.

At 304, the user selects which data fields they would like the SP 103 to collect/verify. Next, the GUI 102 allows the user to tailor the specifications of the SP 103 at 305. This includes allowing the user to enter a text title to be initially displayed to the user when the SP 103 is started, a collection order in which the data should be collected by the SP 103, a type of validation that should be done for each data field, indicators to instruct the SP 103 to add time and/or date stamps to the scanner file 107, the number of data fields to be collected by the SP 103, a name for the scanner file 107 and the database name. This information is used to build the format file 104.

At 306, the GUI 102 builds the format file 104. This file will be used by the SP 103 to tailor itself for collection/verification of the specific information the user wants. Next, at 307, the user specifies which filter, if any, is to be used when building the data set 105. The user may want the entire data set of the selected data fields or just a small sub-set. This option gives the user the flexibility to make this choice.

At 308, the GUI 102 builds the data set 105 based on the data filter specified by the user at 307. The format of the data set 105 is based on information collected in 304 and 305. Next, the GUI 102 ensures that the SP 103 is transferred to the PCMCIA card along with the job's data set 105 and format file 104 for use in the hand held scanner 106 at 309.

At 310, the user starts the SP 103 after the PCMCIA card has been inserted into the scanning device 106. After the SP 103 is started, it reads the format file 104 at 311. As the SP 103 reads the format file 104, it internally configures itself to run based on the specifications specified by the user in 304 and 305. Then, the SP 103 will prompt the user for the next data item to be scanned by the scanning device 106 at 312.

At 313 is where the main processing for SP 103 occurs. The SP 103 displays a data prompt of a specified field on the scanning device 106. If this field is among the fields contained in the downloaded data set 105, then that associated data will be displayed to the user as well. Next, the user will collect data by either keying or scanning data associated with the displayed data prompt into the scanning device 106. The SP 103 then performs validation of the collected data to ensure that it is acceptable. If the data is valid, and if the current field is the key field (the key field indicates this is the field used to search against the data set) then the SP 103 searches the data set for a matching record. If a matching record is found, the SP 103 stores all associated record information. If a matching record is not found, the SP 103 indicates this to the user. If the current field is not the key field and if the current field is the last data field to be collected, then at 314, the SP 103 creates the scanner file 107 to be uploaded to the GUI 102 via the PCMCIA card. If the current field is not the last data field to be collected, the SP displays the display prompt of the next data field and the process is repeated. This process continues until the user quits the SP 103 at 315.

Next, the user prepares the transfer medium between PC 100 and hand held scanner 106. In this embodiment, since the transfer medium is a PCMCIA card, the user simply removes it and places it in the PC's PCMCIA card drive.

At 316, the user specifies the NYTBridge job name to the GUI 102. The user can have many different NYTBridge jobs, each having its own unique data set structure. By specifying the NYTBridge job name, it ensures that the GUI 102 has the job information from the appropriate job file. Based on the job name, the GUI 102 reads the information in the scanner file 107 from the PCMCIA card at 317. Then, the GUI 102 archives and updates the database 101 for the user at 318. At the same time or before the GUI 102 updates the database 101, it archives the information to be modified in case the user needs to "rollback" the database updates.

Figure 4:
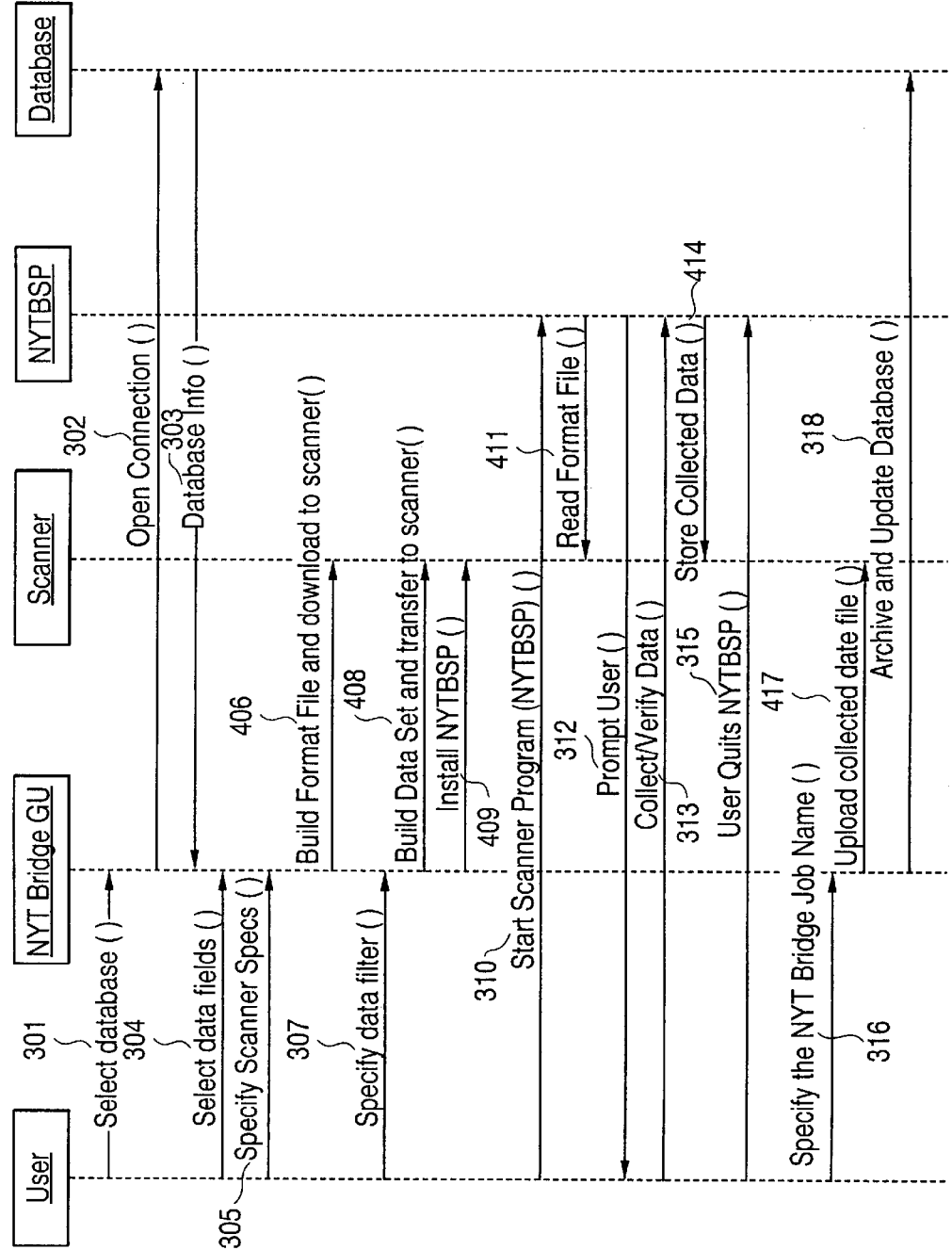
FIG. 4 is a comprehensive task sequencing diagram of a second embodiment of the present invention.

FIG. 4 is a sequence diagram of another embodiment of the NYTBridge that does not use a PCMCIA card to transfer the data set 105, format file 104, SP 103, and scanner file 107 between the PC 100 and the scanner device 106. In this embodiment, the scanning device 106 has an internal memory and either serial port communication or communication dock tethering is used to transfer the information between the scanning device 106 and the PC 100.

All of the actions that are the same in FIG. 4 as in FIG. 3 are labeled using the same numbers and discussion of these actions is omitted. As for the newly numbered actions 406, 408, 409, 411, 414, and 417, they are very similar to 306, 308, 309, 311, 314, and 317, respectively. A significant difference between the actions illustrated in FIGS. 3 and 4 is that instead of the information (i.e. SP 103, format file 104, data set 105 and scanner file 107) being stored on a PCMCIA card for transfer between the scanning device 106 and the PC 100, the information is being stored on a memory (not shown) located within the scanning device 106 and being transferred via either serial port communication or communication dock tethering. The user should ensure that all of the required connections between the PC 100 and hand held scanner 106 are made so the information can be transferred.

The NYTBridge is designed so that it can be used by anyone who has a need to download data from within a database to a scanner. This data can be used to verify information collected by the scanner to determine what actually physically exists in a user's inventory (i.e. the quantity of an item on hand, the physical location of the item, etc.). The NYTBridge is also designed to provide the user with the ability to easily collect data with a scanner to update a database without previously downloading data from the database.

Figure 5:
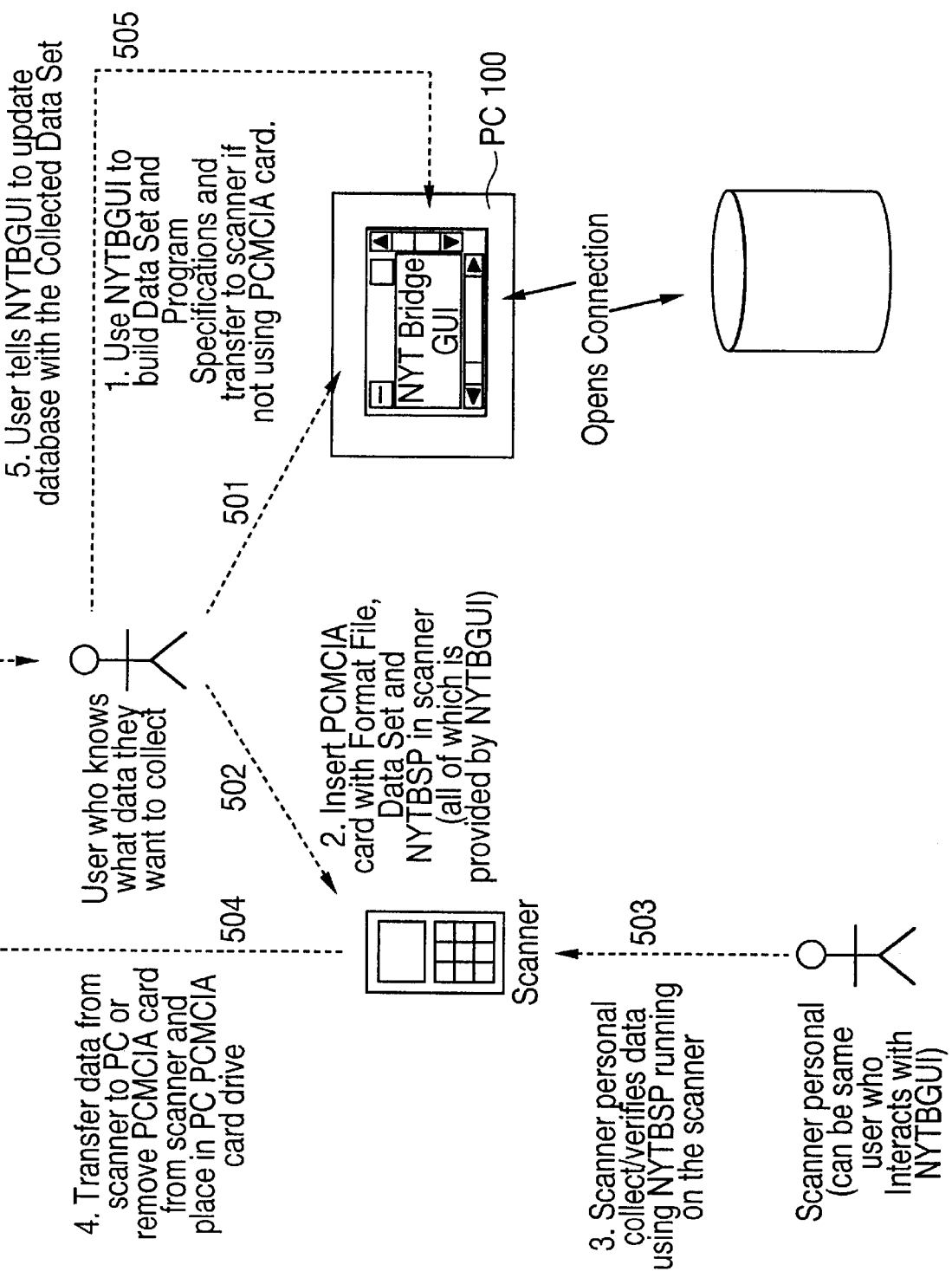
FIG. 5 is a diagram of an inventory management process using the present invention.

FIG. 5 illustrates an example of how a user could use the NYTBridge. At 501, the user interacts with the GUI 102 to specify data they would like to collect with the scanning device 106. Each of the data fields can be custom configured through the GUI 102 as follows. The GUI 102 allows the user to ensure that specific validation rules are obeyed. For example, the user can ensure that the scanning device's 106 input is an exact length, control whether the data field can be skipped, whether or not the data must be scanned, and whether special characters are allowed to be input. The GUI 102 also allows the user to determine whether the data collected by the scanning device 106 is to be displayed as subsequent data is collected. The user also has the ability to add, remove and reorder the data fields as they see fit.

Once all the information is collected, the GUI 102 will build the data set 105 and the format file 104, which will be downloaded to the PCMCIA card or the hand held scanner directly via either serial port communication or communication dock tethering, along with the SP 103, if necessary.

At 502, which is only necessary if using a PCMCIA card as the communication medium, the user simply takes the PCMCIA card from the PC drive (not shown) and places it inside the scanning device 106.

At 503, the user collects/verifies data with the scanning device 106 which is running the SP 103. The SP 103 guides the user of the scanning device 106 through the data collection process, utilizing configured verification mechanisms for each data field. Once all the information for a specific item has been collected, the SP 103 stores the data in a scanner file 107 on the PCMCIA card, if one is being used, or to a memory in the hand held scanner 106 as a scanner file 107. This process continues until the user is finished gathering data.

Next, at 504, the scanner file 107 is transferred from the scanning device 106 to the PC 100 using either the PCMCIA card or via either serial port communication or communication dock tethering.

Lastly, at 505, the user tells the GUI 102 to update the database. The GUI 102 will prompt the user to make sure it is using the correct job information. Once this is verified, the GUI 102 "seamlessly" updates the database with the information from the scanner file 107.

The GUI 102 can also operate without establishing a connection to a database. In order for the GUI 102 to operate in this mode, the user requests to "Create a New Job without Database Interaction" from Screen One of the menu discussed above.

When this selection is made, the GUI displays a different screen set two from the one discussed previously when the user had requested to "Create a New Job for Database Interaction" from the menu. This screen set is titled "Screen Set Two: Specifying the Working Data Fields" and is generated by the GUI 102. This screen set will allow the user to add new working data fields. Each new field that is added by the user is a new field of information that must be collected by the scanning device 106. As the user adds new working data fields, they will be prompted to enter information about each field. This information includes the following.

a. Data Type (string, number, etc.).

b. Data Size (maximum number of characters).

c. Prompt—text displayed to the user when collecting information for this data field.

d. Display Collected Data—whether or not the collected data should be displayed to the user when additional data is collected.

e. Collection Type/Validation Type—indicates whether the collected data has to have an exact length, whether the collected data can have blanks, whether the collected data has to be a numbers, whether the collected data can have special characters in it, whether the collected data has to be scanned.

After all of the new working data fields have been added by the user, a new screen set three is displayed by the GUI 102. This screen set three is similar to the previous screen set four and is titled "Screen Set Three: NYTBSP Program Specifications." This screen set will prompt the user to answer questions about the SP 103. Once the user has answered all the questions, the GUI 102 will take the information and display it to the user. The user will have the ability to change any specifications at this point in time.

Once the user is satisfied with the specifications that they have entered, the GUI displays a new screen set four by the GUI 102. This screen set four is similar to the previous screen set six and is titled "Screen Set Four: Verification". This screen set goes through all of the information collected and ensures that the information entered by the user will work correctly with the SP 103. If there are problems, the GUI 102 will inform the user of these problems so the user can fix them. Once the GUI 102 determines there are no problems with the information, it will build the format file 104 and save the information as a job file so that it can be retrieved at a later time. The GUI 102 will then transfer the SP 103, if necessary, and the format file 104 to the hand held scanner 106. The user is now ready to use the SP 103 running on the scanning device 106 to collect whatever information they wish for the new working data fields.

After the user has collected information for the new working data fields, the GUI 102 will display a new screen set five which differs from the screen set five previously discussed, but somewhat similar to the previous screen set seven and titled "Screen Set Five: Uploading Data from a Scanner". This allows the user to specify which job they are uploading data for. Once the user has specified a job, the GUI 102 uploads the data in the scanner file 107 into the PC 100.

In this mode of operation, the GUI 102 "seamlessly" generates a format file 104 based on specifications provided by the user. The format file 104 is downloaded to a scanning device 106 running the SP 103. Once the scanning device (hand held scanning device) 106 is used by the user to collect data, the scanner file 107 is then uploaded to the GUI 102 and stored on the PC 100.

Although the invention has been described in terms of the preferred and alternative embodiments disclosed herein, those skilled in the art will appreciate other alternative embodiments that do not depart from the spirit and scope of the teachings of the invention. All such embodiments are intended to be included within the scope of the claims appended hereto.

We claim as our invention:

1. A computer program embodied on a computer readable medium for use with a computer for enabling a user to interact with a scanning device and a database program, said computer program comprising:

computer readable program code operable to cause the computer to extract a database having at least one data field from the database program based on information received from the user;

computer readable program code operable to display the at least one data field for selection by the user;

computer readable program code operable to build a format file based on specifications received from the user to configure a scanning program on the scanning device;

computer readable program code operable to build a data set based on the at least one data field selected by the user;

computer readable program code operable to receive a scanner file from the scanning device; and computer readable program code operable to update the at least one data field using the scanner file.

2. A computer program claimed in claim 1, further comprising:

computer readable program code operable to transfer the data set to the scanning device; and computer readable program code operable to transfer the format file to the scanning device.

3. A computer program claimed in claim 2, further comprising computer readable program code operable to transfer the scanning program to the scanning device.

4. A computer program claimed in claim 1, further comprising computer readable program code operable to archive the database prior to or at the same time as updating the at least one data field selected by the user.

5. A computer claimed in claim 4, wherein said computer readable program code operable to archive the database comprises computer readable program code operable to create an audit trail that can be used to rollback any changes to the database that occurred during updating the at least one data field.

6. A computer program claimed in claim 1, wherein said computer readable program code operable to extract the database comprises computer readable program code operable to extract the database having at least one data field from the database program based on receiving from the user at least one of a database type, database size, database location, username and password.

7. A computer program claimed in claim 1, wherein said computer readable program code operable to extract the database comprises computer readable program code operable to establish a connection to the database utilizing active data objects.

8. A computer program claimed in claim 1, further comprising computer readable program code operable to create and save a job file based on the information from the user.

9. A computer program claimed in claim 3, wherein said computer readable program code operable to transfer the data set and the format file to the scanning device comprises computer readable program code operable to copy the data set and the format file to a PCMCIA card for use in the scanning device.

10. A computer program claimed in claim 1, wherein said computer readable program code operable. to receive the scanner file from the scanning device comprises computer readable program code operable to copy the scanner file from a PCMCIA card for use in the scanning device.

11. A computer program claimed in claim 1, wherein said computer readable program code operable to build the format file comprises computer readable program code operable to build the format file having at least one of:

a text title to be displayed when the scanner program is started;

a collection order to configure the scanner program to collect the scanning data in a specified order;

a validation type to configure the scanner program to perform a specific type of validation;

an indicator to configure the scanner program to time stamp the scanner file;

an indicator to configure the scanner program to date stamp the scanner file;

a number of data fields to be collected by the scanning device;

a database name; and a name for the scanner file.

12. A computer program claimed in claim 1, wherein said computer readable program code operable to build the data set further comprises computer readable program code operable to build the data set based on a data filter selected by the user, wherein the data filter determines how much of the at least one data field selected by the user is contained in the data set.

13. A computer program claimed in claim 3, wherein said computer readable program code operable to transfer the scanning program to the scanning device comprises computer readable program code operable to transfer the scanning program which is operable to configure itself based on the format file, collect data via the scanning device, validate the data collected based on the format file, and save the data in the scanner file.

14. A computer program claimed in claim 13, wherein said computer readable program code operable to transfer the scanning program to the scanning device further comprises computer readable program code operable to transfer a scanning program which is further operable to verify that the data collected corresponds to the data set.

15. A computer program claimed in claim 1, further comprising computer readable program code operable to verify that the specifications will work with the scanning program.

16. A computer program embodied on a computer readable medium for use with a computer for enabling a user to interact with a scanning device, said computer program comprising:

computer readable program code operable to create at least one data field based on information received from the user;

computer readable program code operable to build a format file based on specifications received from the user to configure a scanning program on the scanning device;

computer readable program code operable to receive a scanner file from the scanning device; and computer readable program code operable to update the at least one data field using the scanner file.

17. A computer program claimed in claim 16, further comprising computer readable program code operable to transfer the format file to the scanning device.

18. A computer program claimed in claim 17, further comprising computer readable program code operable to transfer the scanning program to the scanning device.

19. A computer program claimed in claim 16, wherein said computer readable program code operable to create the at least one data field comprises computer readable program code operable to create at least one data field based on receiving from the user at least one of a data type, data size, text to be displayed when data is being collected for the at least one data field, an indication of whether the data being collected should be displayed while additional data is collected, a collection type and a validation type.

20. A computer program claimed in claim 16, further comprising computer readable program code operable to create and save a job file based on the information from the user.

21. A computer program claimed in claim 18, wherein said computer readable program code operable to transfer the format file and the scanning program to the scanning device comprises computer readable program code operable to copy the format file and the scanning program to a PCMCIA card for use in the scanning device.

22. A computer program claimed in claim 16, wherein said computer readable program code operable to receive the scanner file from the scanning device comprises computer readable program code operable to copy the scanner file from a PCMCIA card for use in the scanning device.

23. A computer program claimed in claim 16, wherein said computer readable program code operable to build the format file comprises computer readable program code operable to build the format file having at least one of:

a text title to be displayed when the scanner program is started;

a collection order to configure the scanner program to collect the scanning data in a specified order;

a validation type to configure the scanner program to perform a specific type of validation;

an indicator to configure the scanner program to time stamp the scanner file;

an indicator to configure the scanner program to date stamp the scanner file;

a number of data fields to be collected by the scanning device;

a database name; and a name for the scanner file.

24. A computer program claimed in 16, further comprising computer readable program code operable to verify that the specification will work with the scanning program.

* * * * *